US011200763B2

(12) United States Patent
Giebat et al.

(10) Patent No.: US 11,200,763 B2
(45) Date of Patent: Dec. 14, 2021

(54) PROVIDING CREDENTIAL SET WHEN NETWORK CONNECTION IS UNAVAILABLE

(71) Applicant: ASSA ABLOY AB, Stockholm (SE)

(72) Inventors: Martin Giebat, Uddevalla (SE); Jan Elfström, Landskrona (SE); Marius Lauritzen, Greåker (NO); Colin Johansen, Moss (NO); Johan Häggbom, Stockholm (SE); Ewan Dunlop, Borgenhaugen (NO); Per Nordbeck, Skanör (SE); Fredrik Allansson, Furulund (SE); Johan Gärde, Tyresö (SE); Stefan Karlsson, Älvsjö (SE); Peter Törnhult, Handen (SE); Christoffer Hellgren, Johanneshov (SE); Claes Jonsson, Täby (SE); Stig Lagerstedt, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/772,960

(22) PCT Filed: Dec. 14, 2018

(86) PCT No.: PCT/EP2018/084862
§ 371 (c)(1),
(2) Date: Jun. 15, 2020

(87) PCT Pub. No.: WO2019/115739
PCT Pub. Date: Jun. 20, 2019

(65) Prior Publication Data
US 2021/0012598 A1    Jan. 14, 2021

(30) Foreign Application Priority Data
Dec. 15, 2017 (EP) .................................. 17207584

(51) Int. Cl.
*H04W 12/08* (2021.01)
*G07C 9/00* (2020.01)
(Continued)

(52) U.S. Cl.
CPC ..... *G07C 9/00571* (2013.01); *G07C 9/00174* (2013.01); *G07C 9/00857* (2013.01);
(Continued)

(58) Field of Classification Search
CPC ............ G07C 9/00571; G07C 9/00904; G07C 2009/00769; G07C 9/00309;
(Continued)

(56) References Cited

U.S. PATENT DOCUMENTS 9,595,148 B2 * 3/2017 Borg ....................... H04W 4/80
2008/0089277 A1   4/2008 Alexander et al.
(Continued)

FOREIGN PATENT DOCUMENTS

CN        103635940        3/2014
CN        104751544        7/2015
(Continued)

OTHER PUBLICATIONS

International Search Report and Written Opinion for International (PCT) Patent Application No. PCT/EP2018/084862, dated Feb. 25, 2019, 14 pages.
(Continued)

*Primary Examiner* — Dionne Pendleton
(74) *Attorney, Agent, or Firm* — Sheridan Ross P.C.

(57) ABSTRACT

It is provided a method for providing a credential set to a credential carrier for gaining access to a physical space. The method is performed in a credential provider and comprises the steps of: preloading a plurality of credential sets from a server into a local memory, each credential set being usable to gain access to a physical space and each credential set
(Continued)

comprising a first validity time; wherein, when a network connection between the credential provider and the server is unavailable, performing the following steps: obtaining a request to provide a credential set for a physical space; retrieving a credential set from the local memory, the credential set being usable to gain access to the physical space indicated in the request; and providing, as long as the first validity time of the credential set has not expired, the retrieved credential set to a credential carrier.

13 Claims, 2 Drawing Sheets

(51) Int. Cl.
*H04W 12/0431* (2021.01)
*H04L 29/06* (2006.01)

(52) U.S. Cl.
CPC ....... *H04L 63/068* (2013.01); *H04W 12/0431* (2021.01); *H04W 12/08* (2013.01); *G07C 2009/00865* (2013.01)

(58) Field of Classification Search
CPC ........... G07C 2009/00412; G07C 2009/00825; G07C 2009/00865; G07C 2209/63; G07C 9/00182; G07C 9/00817; G07C 9/00857; G07C 9/20; G07C 9/22; G07C 9/27; G07C 9/28; G07C 9/38; G07C 9/00174; G07C 9/29; G07C 9/215; E05B 47/00; G06F 16/90335; G06Q 10/02; G08C 17/02; H04L 12/2816; H04L 63/107; H04L 67/12; H04L 67/18; H04L 63/068; H04W 12/0804; H04W 84/18; H04W 88/16; H04W 8/005; H04W 92/02; H04W 12/0023; H04W 12/04; H04W 12/08; H04W 4/80; H04W 12/0431; H04W 12/084

See application file for complete search history.

(56) References Cited

U.S. PATENT DOCUMENTS

| | | | |
|---|---|---|---|
| 2011/0187493 A1 | 8/2011 | Elfstroem et al. | |
| 2012/0222103 A1* | 8/2012 | Bliding | G07C 9/00571 726/7 |
| 2013/0271261 A1 | 10/2013 | Ribas et al. | |
| 2014/0373111 A1* | 12/2014 | Moss | G07C 9/00309 726/5 |
| 2016/0269392 A1* | 9/2016 | Arumugam | H04L 63/083 |
| 2017/0018130 A1* | 1/2017 | Robinson | G07C 9/38 |
| 2017/0311161 A1* | 10/2017 | Kuenzi | H04W 12/08 |
| 2017/0372411 A1* | 12/2017 | Kolegraff | G07C 9/27 |
| 2020/0250896 A1* | 8/2020 | Vossoughi | H04W 4/023 |

FOREIGN PATENT DOCUMENTS

| | | |
|---|---|---|
| EP | 2207146 | 7/2010 |
| EP | 2821970 | 1/2015 |
| EP | 3139353 | 3/2017 |
| WO | WO 2014/132211 | 9/2014 |
| WO | WO 2016/202780 | 12/2016 |

OTHER PUBLICATIONS

International Preliminary Report on Patentability for International (PCT) Patent Application No. PCT/EP2018/084862, dated Mar. 3, 2020, 14 pages.
Second Written Opinion for International (PCT) Patent Application No. PCT/EP2018/084862, dated Oct. 29, 2019, 7 pages.
Extended Search Report for European Patent Application No. 17207584.8, dated Jun. 22, 2018, 8 pages.
Official Action with English Translation for China Patent Application No. 201880080680.9, dated Jun. 23, 2021, 18 pages.

* cited by examiner

PROVIDING CREDENTIAL SET WHEN NETWORK CONNECTION IS UNAVAILABLE

CROSS REFERENCE TO RELATED APPLICATIONS

This application is a national stage application under 35 U.S.C. 371 and claims the benefit of PCT Application No. PCT/EP2018/084862 having an international filing date of Dec. 14, 2018, which designated the United States, which PCT application claimed the benefit of European Patent Application No. 17207584.8 filed Dec. 15, 2017, the disclosure of each of which are incorporated herein by reference.

TECHNICAL FIELD

The invention relates to a method, a credential provider, a computer program and a computer program product for providing a credential set for gaining access to a physical space when a network connection between a credential provider and a server is unavailable.

BACKGROUND

Electronic keys have largely replaced traditional keys in hospitality applications, such as for hotels, cruise ships, student housing, care homes, etc. Traditional solutions for electronic locks involve a local server installed locally at each site for the generation of electronic keys.

Solutions are now proposed where some parts of an electronic access control system are provided at a central server, also referred to as some components being provided in the cloud. The credentials for access to the different physical spaces, such as hotel rooms, are generated at the central server using a private key. This reduces complexity at each site and reduces the risk of an attacker getting hold of the private key, since there is no private key provided at the local site. In other words, private keys for credential generation are stored only by the server for increased security.

However, it is important that it is possible to provide credentials, such as key cards, even when the network connection to the server drops. At the same time, private key security should be under control of the server.

SUMMARY

It is an object to provide a solution for providing credentials for access to a physical space even when a network connection to a server is unavailable.

According to a first aspect, it is provided a method for providing a credential set to a credential carrier for gaining access to a physical space. The method is performed in a credential provider provided at the same site as the physical space and comprises the steps of: preloading a plurality of credential sets from a server into a local memory, each credential set being usable to gain access to a physical space and each credential set comprising a first validity time; wherein, when a network connection between the credential provider and the server is unavailable, performing the following steps: obtaining a request to provide a credential set for a physical space; retrieving a credential set from the local memory, the credential set being usable to gain access to the physical space indicated in the request; and providing, as long as the first validity time of the credential set has not expired, the retrieved credential set to a credential carrier.

The step of providing the credential set may comprise writing the credential set on a key card.

The step of providing the credential set may comprises sending the credential set to a personal electronic device of the user.

The personal electronic device may be a smartphone.

At least one credential set may comprise credential set being usable to gain access to a plurality of physical spaces.

In the step of providing the retrieved credential set, the credential set may be provided with a second validity time.

The step of preloading a plurality of credential sets may be repeated regularly. In such a case, each preloading comprises discarding any previously preloaded credential sets.

According to a second aspect, it is provided a credential provider for providing a credential set to a credential carrier for gaining access to a physical space. The credential provider comprises: a processor; and a memory storing instructions that, when executed by the processor, cause the credential provider, when provided at the same site as the physical space, to: preload a plurality of credential sets from a server into a local memory, each credential set being usable to gain access to a physical space and each credential set comprising a first validity time. When a network connection between the credential provider and server is unavailable, the credential provider performs instructions that, when executed by the processor, cause the credential provider to: obtain a request to provide a credential set for a physical space; and retrieve a credential set from the local memory, the credential set being usable to gain access to the physical space indicated in the request; and provide, as long as the first validity time of the credential set has not expired, the credential set to a credential carrier.

The instructions to provide the credential set may comprise instructions that, when executed by the processor, cause the credential provider to write the credential set on a key card.

The instructions to provide the credential set may comprise instructions that, when executed by the processor, cause the credential provider to send the credential set to a personal electronic device of the user.

The personal electronic device may be a smartphone.

At least one credential set may comprise credential set being usable to gain access to a plurality of physical spaces.

Each credential set may comprise a validity time. In such a case, the credential provider further comprises instructions that, when executed by the processor, cause the credential provider to execute the instructions to provide the credential set is only when the validity time of the credential set has not expired.

The instructions to provide the retrieved credential set may comprise instructions that, when executed by the processor, cause the credential provider to provide the credential set with a second validity time.

According to a third aspect, it is provided a computer program for providing a credential set for gaining access to a physical space. The computer program comprises computer program code which, when run on a the credential provider causes the credential provider, when provided at the same site as the physical space, to: preload a plurality of credential sets from a server into a local memory, each credential set being usable to gain access to a physical space and each credential set comprising a first validity time. When a network connection between the credential provider and server is unavailable, computer program code is run to: obtain a request to provide a credential set for a physical space; retrieve a credential set from the local memory, the credential set being usable to gain access to the physical space indicated in the request; and provide, as long as the first validity time of the credential set has not expired, the credential set to a credential carrier.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein rely on credential sets being preloaded at a local site from a server to allow credential sets to be provided even if the network connection to the server becomes unavailable. Each credential set is usable for gaining access to a particular physical space, e.g. room. In this way, a credential can be provided at any time to a person needing access to a particular physical space, e.g. a guest checking in at a hotel when the Internet connection is down.

Figure 1:
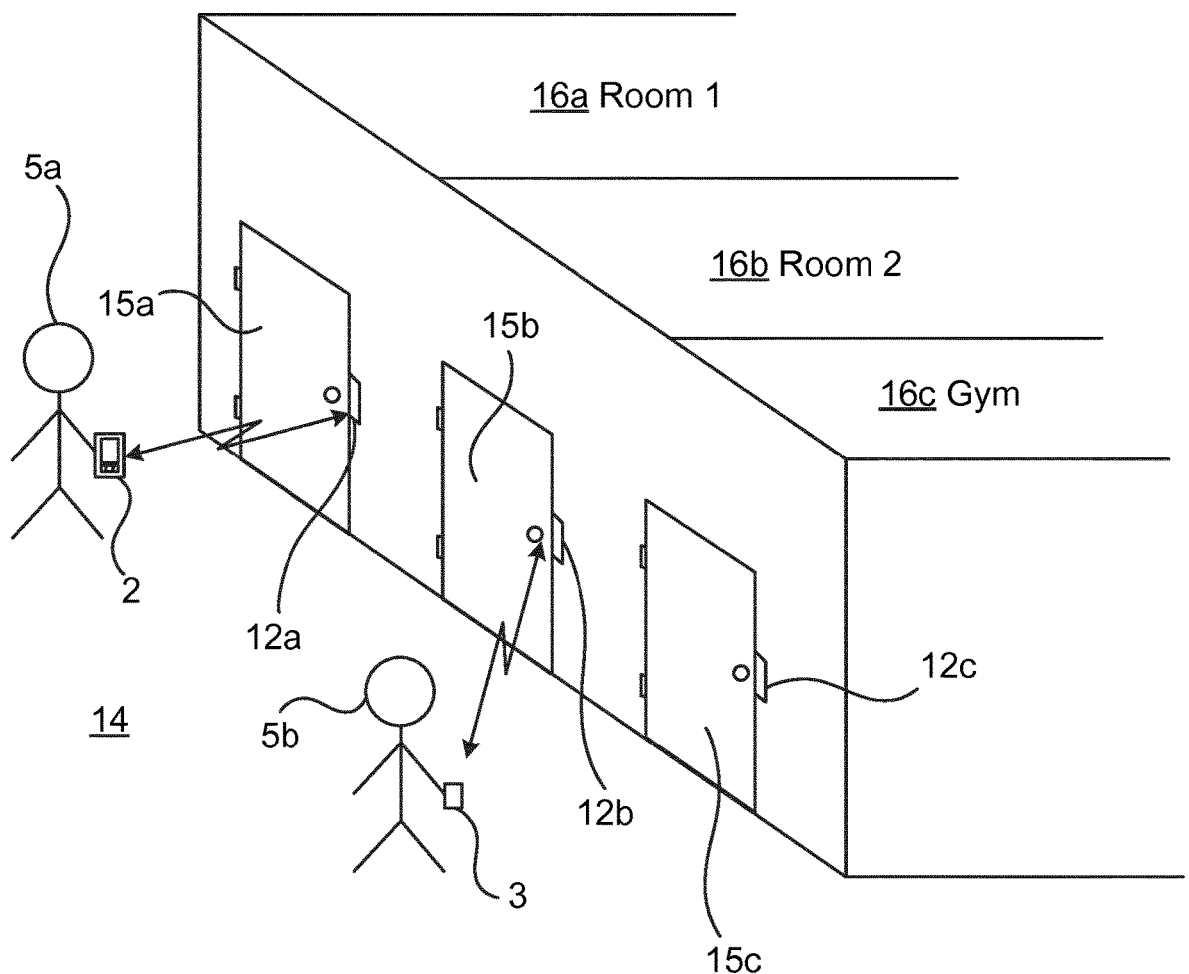
FIG. 1 is a schematic diagram showing an environment in which embodiments presented herein can be applied.

FIG. 1 is a schematic diagram showing an environment in which embodiments presented herein can be applied. This example relates to a hotel, but the embodiments presented herein can equally well be applied for any site where physical spaces are secured by electronic locks and credential generation is important also when a network connection goes down. For instance, the embodiments presented herein can be applied in sites such as cruise ships, student housing, care homes, offices, etc.

In this example, there is a first physical space 16a which is a first hotel room, a second physical space 16b which is a second hotel room and a third physical space 16c which is a gym, being a common space. The hotel can of course comprise more hotel rooms and more common spaces.

Access to the physical spaces 16a-c is restricted by a respective physical barrier 15a-c which is selectively unlockable. The physical barrier 15a-c stands between the restricted physical space 16a-c and an accessible physical space 14. Note that the accessible physical space 14 can be a restricted physical space in itself, but in relation to this physical barriers 15a-c, the accessible physical space 14 is accessible. The barriers 15a-c can be a door, gate, hatch, window, drawer, etc. In order to unlock the barriers 15a-c, a respective electronic lock 12a-c is provided. The electronic locks 12a-c are each selectively controllable to be set in an unlocked state or locked state.

A first user 5a has been assigned the first room, i.e. the first physical space 16a and a second user 5b has been assigned the second room, i.e. the second physical space 10. Both users 5a-b have been given access to the third physical space 16c, i.e. the gym. The first user 5a has a credential carrier 2 in the form of a personal electronic device being a smartphone. The credentials to gain access to the first physical space 16a and the third physical space 16c have been loaded onto the credential carrier 2 of the first user 5a by a credential provider (1 of FIG. 2). The second user 5b has a credential carrier 3 in the form of a key card. The credentials to gain access to the second physical space 16b and the third physical space 16c have been loaded onto the credential carrier 3 of the second user 5b by the credential provider.

The electronic locks 12a-c are able to receive and send signals from/to the credential carriers 2, 3 over a communication channel which may be a short range wireless interface or a conductive (i.e. galvanic/electric) connection. The credential carriers 2, 3 are any suitable device portable by a user and which can be used for authentication over the communication channel. The electronic key 2 is typically carried or worn by the user and may be implemented as a key card, a physical key electronic key, a key fob, or a personal electronic device such as a wearable device, a smartphone, a tablet computer etc. The short range wireless interface could e.g. conform to any one or more of NFC (Near Field Communication), Bluetooth, Bluetooth Low Energy (BLE), ZigBee, any of the IEEE 802.11 standards, any of the IEEE 802.15 standards, wireless USB, etc. Using the communication channel, the authenticity and authority of the credentials of the credential carriers 2, 3 can be checked, after which the electronic locks 12a-c grants or denies access.

When access is granted, the respective electronic lock 12a-c is set in an unlocked state. When a lock device 12a-c is in an unlocked state, the respective barrier 15a-c can be opened and when a lock device 12a-c is in a locked state, the respective barrier 15a-c cannot be opened. In this way, access to the physical spaces 16a-c is controlled by the respective electronic locks 12a-c. It is to be noted that the electronic locks 12a-c can be installed in a fixed structure next to the physical barriers 15a-c (as shown) or in the physical barrier 15a-c itself (not shown).

Figure 2:
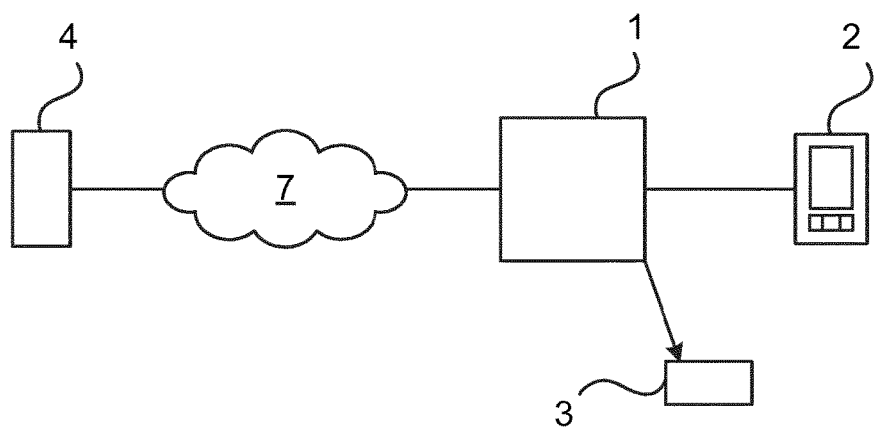
FIG. 2 is a schematic diagram showing how credential sets can be provided for use in the environment of FIG. 1.

FIG. 2 is a schematic diagram showing how credential sets can be loaded on credential carriers for use in the environment of FIG. 1. A credential provider 1 is configured to provide credential sets to credential carriers 2, 3 when needed. As shown in FIG. 1 and explained above, the credential carriers 2, 3 are used to gain access to various physical spaces, such as hotel rooms and common areas. The credential provider 1 is provided at the same site as the physical spaces.

The term credential set is used herein to denote a set of at least one credential data being usable for gaining access to a physical space. A credential set can comprise credential data for one or more physical spaces. The credential set can also comprise validity data, which limits when the credential set can be provided to a credential carrier. The credential set does not need to contain any more data than one or more credential data being usable for gaining access to physical space. Hence, the credential set, in its simplest form, consists of one instance of such credential data.

The credential provider 1 is connected to a server 4 via a network 7, which can be a wide area network, such as the Internet, and/or a local area network.

The server 4 is centrally located (i.e. not at the same site as the physical spaces to which access is controlled) and one server 4 can be used for several credential providers 1. The server 4 has access to a private key for generating credential data which is usable for gaining access to the physical spaces. When the network connection between the credential provider 1 and the server 4 is available, and a credential set needs to be loaded on a credential carrier, the credential provider 1 requests such a credential set from the server 4. The server generates the credential set using its private key and sends the credential set to the credential provider 1, which then loads the credential set on the credential carrier.

According to embodiments herein, to allow a credential set to be loaded on a credential carrier also when the network connection is down, credential sets are preloaded to a local storage of the credential provider 1.

If the connection between the credential provider 1 and the server 4 drops, i.e. becomes unavailable, and an electronic key needs to be provided (by providing a credential set to a credential carrier 2, 3), the credential provider obtains the credential set for the physical space from the local storage and provides the credential set to the credential carrier 2, 3 to thereby provide a valid electronic key comprising the credential set.

Figure 3:
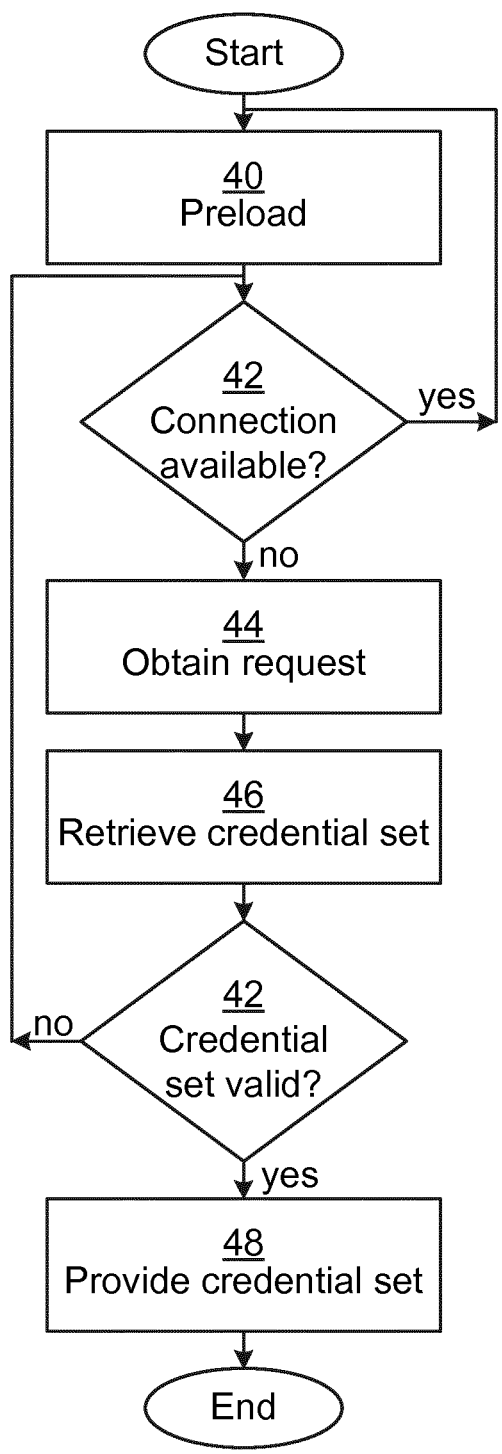
FIG. 3 is a flow chart illustrating a method for providing a credential set, the method being performed in the credential provider of FIG. 2.

FIG. 3 is a flow chart illustrating a method for providing a credential set, the method being performed in the credential provider of FIG. 2. The credential set can be used for gaining access to a physical space, see e.g. physical spaces 16a-c of FIG. 1. The credential provider is provided at the same site as the physical spaces for which the credential provider is used to provide credentials.

In a preload step 40, the credential provider preloads a plurality of credential sets from a server into a local memory/storage. Each credential set is usable to gain access to a physical space. Each credential set comprises a first validity time. The first validity time is set by the server. Optionally, this is authenticated by an electronic signature of the first validity time by the server.

The credential sets can be used to gain access to one or optionally to several physical spaces. Hence at least one credential set comprises credential data that may be usable to gain access to a plurality of physical spaces, such as a personal physical space (e.g. hotel room) and a common physical space (e.g. gym).

It is to be noted that the preload step 40 can be executed in a different sequence of execution, such as thread or process, than the rest of the method.

In a conditional connection available step 42, the credential provider determines when a network connection between the credential provider and server is available or not. When the connection is available, the method returns to the preload step 40, optionally after a wait (not shown).

When the preload step 40 is re-performed, each preloading comprises discarding any previously preloaded credential sets.

When the connection is unavailable, the method proceeds to an obtain request step 44.

In the obtain request step 44, the credential provider obtains a request to provide a credential set for a physical space. For instance, the request can be a request to generate an electronic key for a particular room, by loading a credential set on a credential carrier (see step 48 below). The request can be obtained using a user interface of the credential provider or the request can be obtained in a signal received (e.g. over internet protocol, IP) from a property management system.

In a retrieve credential set step 46, the credential provider retrieves a credential set from the local memory. The credential set is usable to gain access to the physical space indicated in the request.

In a conditional credential set valid step 47, the credential provider determines when the first validity time of credential set has expired or not. If the first validity time has expired, i.e. the credential set is not valid, the method returns higher up in the method, e.g. to the conditional connection available step 42. If the first validity time has not expired, i.e. the credential set is valid, the method proceeds to a provide credential set step 48. The first validity time is set to a duration which exceeds the repetition interval of performing the preload step 40 in order to always have valid credential sets. Using the first validity time, the damage, if the locally stored the credential sets were to be stolen, is greatly limited compared to if there were to be no validity time applied for the credential sets.

In the provide credential set step 48, the credential provider provides the retrieved credential set, i.e. the credential set retrieved from local memory in the previous step, to a credential carrier. The retrieved credential set can be provided to the credential carrier over local communication. A valid electronic key is thus provided by the credential carrier comprising the credential set. The credential set can be stripped of any other data (such as the first validity time which is enforced by the credential provider in step 47) than credential data prior to being provided to the credential carrier. At this point, the credential provider optionally provides the credential set with a second validity time. The second validity time applies to the key provided by loading the credential carrier can be independent of the first validity time. For instance, the key provided by loading the credential set on the credential carrier might need to be valid for a period which is longer than the duration of the first validity time.

An example in a hotel setting illustrating the first and second validity times will now be described. In this example, the first validity time is set to fourteen days from generation of the credential sets, and the credential sets are generated and preloaded on a weekly basis. The second validity time is determined based on the person checking in. For instance, if a person checks in to stay 30 nights in the hotel, the second validity time is set to thirty days, which is longer than the first validity time. On the other hand, if a person checks in for a single night, the second validity time is set to one day, which may be shorter than the first validity time.

Hence, the lock only allows access when the second validity time has not expired. In one embodiment, the lock checks the first validity time only the first time an electronic key is presented and ignores the first validity time subsequently. Alternatively, the first validity time is only checked when providing the credential set and not in the locks.

In one embodiment, the credential set is written on a key card. Alternatively or additionally, the credential set is sent to a personal electronic device of the user. The personal electronic device can e.g. be a smartphone, a wearable device or a tablet computer.

When the unavailable connection to the server also prevents the credential provider from communicating with the personal electronic device over the wide area network, the credential provider can use a communication protocol which does not depend on wide area network availability to send the credential set to the personal electronic device. Examples of such communication protocols are Bluetooth, BLE, NFC, or local WiFi network.

When the unavailable connection to the server does not prevent the credential provider from communicating with the personal electronic device over the wide area network, the credential provider could use the wide area network to send the credential set to the personal electronic device.

Using this solution, keys for users can be generated by providing a corresponding credential set to a credential carrier, even when the network connection is dropped. Since the credential provider is provided at the same site as the physical spaces, local credential carriers can be provided with appropriate credentials when needed, also when network outage occurs. Specifically, physical key cards can be generated when network outage occurs. Moreover, the private key for credential generation never leaves the server, thus maintaining secure storage of the private key and reducing the risk of an attacker getting hold of the private key.

Figure 4:
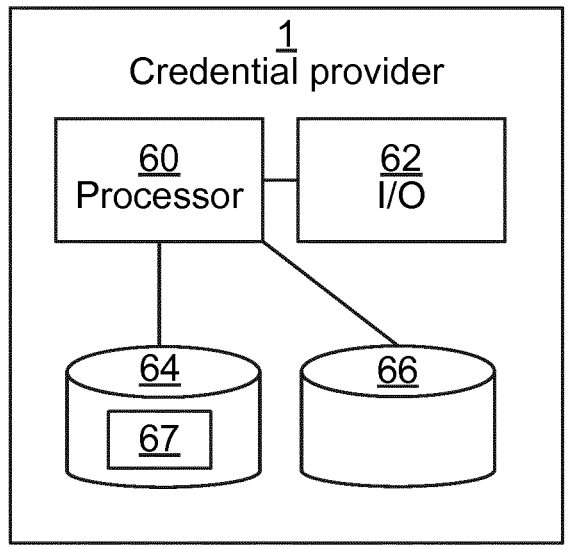
FIG. 4 is a schematic diagram illustrating components of the credential provider of FIG. 2 according to one embodiment.

FIG. 4 is a schematic diagram illustrating components of the credential provider 1 of FIG. 2. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of random access memory (RAM) and read only memory (ROM). The memory 64 also comprises persistent storage, which, for example, can be any single one or combination of magnetic memory, optical memory, and solid-state memory.

A data memory 66 is also provided for reading and/or storing data during execution of software instructions in the processor 60. The data memory 66 is used for storing preloaded credential sets. The data memory 66 can be magnetic memory, optical memory, and solid-state memory. The data memory is local to the credential provider 1 and can form part of the credential provider 1 or can be connected locally to the credential provider 1.

The credential provider 1 further comprises an I/O interface 62 for communicating with other external entities. Optionally, the I/O interface 62 also includes a user interface.

Other components of the credential provider 1 are omitted in order not to obscure the concepts presented herein. It is to be noted that the credential provider 1 may be provided as part of a host device, e.g. apparatus also used for other purposes. In such a case, one or more of the illustrated components can be shared with the host device.

Figure 5:
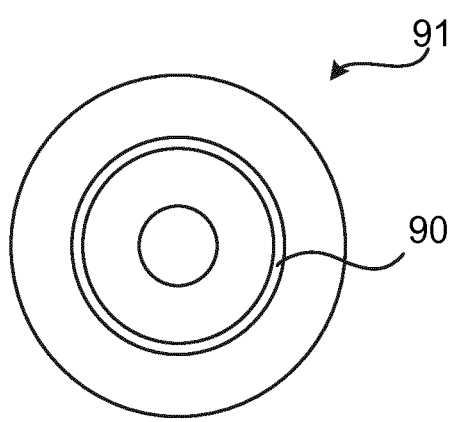
FIG. 5 shows one example of a computer program product comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for providing a credential set to a credential carrier for gaining access to a physical space, the method being performed in a credential provider and comprising the steps of:
preloading a plurality of credential sets from a server into a local memory, each credential set being usable to gain access to a physical space and each credential set comprising a first validity time;
wherein, when a network connection between the credential provider and the server is unavailable, performing the following steps:
obtaining a request to provide a credential set for a physical space;
retrieving a credential set from the local memory, the credential set being usable to gain access to the physical space indicated in the request; and
providing, as long as the first validity time of the credential set has not expired, the retrieved credential set to a credential carrier.

ii. The method according to embodiment i, wherein the step of providing the credential set comprises writing the credential set on a key card.

iii. The method according to embodiment i, wherein the step of providing the credential set comprises sending the credential set to a personal electronic device of the user.

iv. The method according to embodiment iii, wherein the personal electronic device is a smartphone.

v. The method according to any one of the preceding embodiments, wherein at least one credential set comprises credential set being usable to gain access to a plurality of physical spaces.

vi. The method according to any one of the preceding embodiments, wherein, in the step of providing the retrieved credential set, the credential set is provided with a second validity time.

vii. The method according to any one of the preceding embodiments, wherein the step of preloading a plurality of credential sets is repeated regularly, and wherein each preloading comprises discarding any previously preloaded credential sets.

viii. A credential provider for providing a credential set to a credential carrier for gaining access to a physical space, the credential provider comprising:
a processor; and
a memory storing instructions that, when executed by the processor, cause the credential provider to:
preload a plurality of credential sets from a server into a local memory, each credential set being usable to gain access to a physical space and each credential set comprising a first validity time;
wherein, when a network connection between the credential provider and server is unavailable, the credential provider performs instructions that, when executed by the processor, cause the credential provider to:
  obtain a request to provide a credential set for a physical space;
  retrieve a credential set from the local memory, the credential set being usable to gain access to the physical space indicated in the request; and
  provide, as long as the first validity time of the credential set has not expired, the credential set to a credential carrier.

ix. The credential provider according to embodiment viii, wherein the instructions to provide the credential set comprise instructions that, when executed by the processor, cause the credential provider to write the credential set on a key card.

x. The credential provider according to embodiment viii, wherein the instructions to provide the credential set comprise instructions that, when executed by the processor, cause the credential provider to send the credential set to a personal electronic device of the user.

xi. The credential provider according to any one of embodiments viii to x, wherein at least one credential set comprises credential set being usable to gain access to a plurality of physical spaces.

xii. The credential provider according to any one of embodiments viii to xi, wherein each credential set comprises a validity time, and wherein the credential provider further comprise instructions that, when executed by the processor, cause the credential provider to execute the instructions to provide the credential set is only when the validity time of the credential set has not expired.

xiii. The credential provider according to any one of embodiments viii to xii, wherein the instructions to provide the retrieved credential set comprise instructions that, when executed by the processor, cause the credential provider to provide the credential set with a second validity time.

xiv. A computer program for providing a credential set to a credential carrier for gaining access to a physical space, the computer program comprising computer program code which, when run on a the credential provider causes the credential provider to:
  preload a plurality of credential sets from a server into a local memory, each credential set being usable to gain access to a physical space and each credential set comprising a first validity time;
  wherein, when a network connection between the credential provider and server is unavailable, running computer program code to:
  obtain a request to provide a credential set for a physical space;
  retrieve a credential set from the local memory, the credential set being usable to gain access to the physical space indicated in the request; and
  provide, as long as the first validity time of the credential set has not expired, the credential set to a credential carrier.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for providing a credential set to a credential carrier for gaining access to a physical space, the method being performed in a credential provider provided at the same site as the physical space and comprising:
  preloading a plurality of credential sets from a server into a local memory, each credential set being usable to gain access to a physical space and each credential set comprising a first validity time;
  wherein, when a network connection between the credential provider and the server is unavailable, performing the following:
  obtaining a request to provide a credential set for a physical space;
  retrieving a credential set from the local memory, the credential set being usable to gain access to the physical space indicated in the request; and
  providing, as long as the first validity time of the credential set has not expired, the retrieved credential set to the credential carrier to enable the credential carrier to be used as an electronic key to gain access to the physical space.

2. The method according to claim 1, wherein the step of providing the credential set comprises writing the credential set on a key card.

3. The method according to claim 1, wherein providing the credential set comprises sending the credential set to a personal electronic device of the user.

4. The method according to claim 3, wherein the personal electronic device comprises a smartphone.

5. The method according to claim 1, wherein at least one credential set comprises credential set being usable to gain access to a plurality of physical spaces.

6. The method according to claim 1, wherein, as part of providing the retrieved credential set, the credential set is provided with a second validity time.

7. The method according to claim 1, wherein preloading a plurality of credential sets is repeated regularly, and wherein each preloading comprises discarding any previously preloaded credential sets.

8. A credential provider for providing a credential set to a credential carrier for gaining access to a physical space, the credential provider comprising:
  a processor; and
  a memory storing instructions that, when executed by the processor, cause the credential provider, when provided at the same site as the physical space, to:
  preload a plurality of credential sets from a server into a local memory, each credential set being usable to gain access to a physical space and each credential set comprising a first validity time;
  wherein, when a network connection between the credential provider and server is unavailable, the credential provider performs instructions that, when executed by the processor, cause the credential provider to:
  obtain a request to provide a credential set for a physical space;
  retrieve a credential set from the local memory, the credential set being usable to gain access to the physical space indicated in the request; and
  provide, as long as the first validity time of the credential set has not expired, the credential set to the credential carrier to enable the credential carrier to be used as an electronic key to gain access to the physical space.

9. The credential provider according to claim 8, wherein the instructions to provide the credential set comprise instructions that, when executed by the processor, cause the credential provider to write the credential set on a key card.

10. The credential provider according to claim 8, wherein the instructions to provide the credential set comprise instructions that, when executed by the processor, cause the credential provider to send the credential set to a personal electronic device of the user.

11. The credential provider according to claim 8, wherein at least one credential set comprises credential set being usable to gain access to a plurality of physical spaces.

12. The credential provider according to claim 8, wherein the instructions to provide the retrieved credential set comprise instructions that, when executed by the processor, cause the credential provider to provide the credential set with a second validity time.

13. A non-transitory computer-readable medium comprising a computer program for providing a credential set to a credential carrier for gaining access to a physical space, the computer program comprising computer program code which, when run on a the credential provider causes the credential provider, when provided at the same site as the physical space, to:
- preload a plurality of credential sets from a server into a local memory, each credential set being usable to gain access to a physical space and each credential set comprising a first validity time;
- wherein, when a network connection between the credential provider and server is unavailable, running computer program code to:
- obtain a request to provide a credential set for a physical space;
- retrieve a credential set from the local memory, the credential set being usable to gain access to the physical space indicated in the request; and
- provide, as long as the first validity time of the credential set has not expired, the credential set to the credential carrier to enable the credential carrier to be used as an electronic key to gain access to the physical space.

* * * * *